United States Patent
Cho

(10) Patent No.: US 7,443,659 B2
(45) Date of Patent: Oct. 28, 2008

(54) MONITOR TILTING STRUCTURE OF CAR AUDIO/VIDEO SYSTEM

(75) Inventor: Se Hyun Cho, Icheon-shi (KR)

(73) Assignee: Hyundai Autonet Co., Ltd., Icheon-Shi Kyungki-Do (KR)

( * ) Notice: Subject to any disclaimer, the term of this patent is extended or adjusted under 35 U.S.C. 154(b) by 302 days.

(21) Appl. No.: 11/307,341

(22) Filed: Feb. 1, 2006

(65) Prior Publication Data
US 2006/0227497 A1    Oct. 12, 2006

(30) Foreign Application Priority Data
Apr. 8, 2005    (KR) ............... 10-2005-0029528

(51) Int. Cl.
*G06F 1/16* (2006.01)
(52) U.S. Cl. ............... 361/681; 248/27.3; 248/284.1; 345/87
(58) Field of Classification Search .......... 361/681
See application file for complete search history.

(56) References Cited

U.S. PATENT DOCUMENTS

| | | | | |
|---|---|---|---|---|
| 5,847,685 A | * | 12/1998 | Otsuki | 345/87 |
| 6,011,685 A | * | 1/2000 | Otsuki | 361/679 |
| 6,398,168 B1 | * | 6/2002 | O Tae | 248/27.3 |
| 6,711,003 B2 | * | 3/2004 | Nakasuna | 361/681 |
| 6,917,516 B2 | * | 7/2005 | Chou | 361/681 |
| 7,113,395 B2 | * | 9/2006 | Hara et al. | 361/681 |
| 7,198,240 B2 | * | 4/2007 | Chen | 248/284.1 |
| 7,224,579 B2 | * | 5/2007 | Lee | 361/681 |
| 2001/0043455 A1 | * | 11/2001 | Bertagna | 361/681 |
| 2002/0066832 A1 | * | 6/2002 | Kwon | 248/27.3 |
| 2006/0072286 A1 | * | 4/2006 | Tseng | 361/681 |
| 2006/0108900 A1 | * | 5/2006 | Lee | 312/319.6 |
| 2006/0232527 A1 | * | 10/2006 | Oh | 345/87 |

FOREIGN PATENT DOCUMENTS

| | | |
|---|---|---|
| KR | 10-0245977 | 12/1999 |
| KR | 1020040106134 | 12/2004 |
| KR | 1020040106615 | 12/2004 |
| KR | 1020040108003 | 12/2004 |
| KR | 1020040108004 | 12/2004 |

* cited by examiner

*Primary Examiner*—Lisa Lea-Edmonds
(74) *Attorney, Agent, or Firm*—IPLA P.A.; James E. Bame

(57) ABSTRACT

A monitor tilting structure of a car audio/video system is provided. The structure includes: a system housing having a car audio/video driving circuit built in; a guide rail provided at an inner side surface of the system housing; a first guide rod provided at one lower side of the system housing; a second guide rod hinged at its lower end with the first guide rod; and a monitor main body having a pin moving on the guide rail, and having a hinge shaft provided at its rear surface, the hinge shaft being connected with an upper end of the second guide rod.

5 Claims, 4 Drawing Sheets

MONITOR TILTING STRUCTURE OF CAR AUDIO/VIDEO SYSTEM

BACKGROUND OF THE INVENTION

1. Field of the Invention

The present invention relates to a car audio/video system, and more particularly, to a monitor tilting structure of a car audio/video system, in which a three-stage transformation can be implemented.

2. Description of the Related Art

In general, a car audio/video system includes a monitor for outputting an image. The monitor is of type being fixed to a front surface of the car audio/video system, or being protruded/inserted into the car audio/video system depending on user's selection.

FIG. 1 is a schematic view illustrating a conventional monitor tilting structure of a car audio/video system.

As shown in FIG. 1, the conventional monitor tilting structure of the car audio/video system includes a system housing 110, a guide rail 120 provided at an inner side surface of the system housing 110, a monitor main body 130 having a pin 132 moving on the guide rail 120, and a guide rod 140 hinged at its upper end with the monitor main body 130.

However, there is a drawback in that the conventional monitor tiling structure performs simple two stage tilting of a 'monitor insertion' stage and a 'monitor protrusion' stage, thereby making it difficult for a user to secure a front sight at the 'monitor protrusion' stage.

SUMMARY OF THE INVENTION

Accordingly, the present invention is directed to a monitor tilting structure of a car audio/video system that substantially overcome one or more of the limitations and disadvantages of the conventional art.

One object of the present invention is to provide a monitor tilting structure of a car audio/video system, capable of being tilted even in a direction of not obstructing a front sight depending on a user convenience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a monitor tilting structure of a car audio/video system, the structure including: a system housing having a car audio/video driving circuit built in; a guide rail provided at an inner side surface of the system housing; a first guide rod provided at one lower side of the system housing; a second guide rod hinged at its lower end with the first guide rod; and a monitor main body having a pin moving on the guide rail, and having a hinge shaft provided at its rear surface, the hinge shaft being connected with an upper end of the second guide rod.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
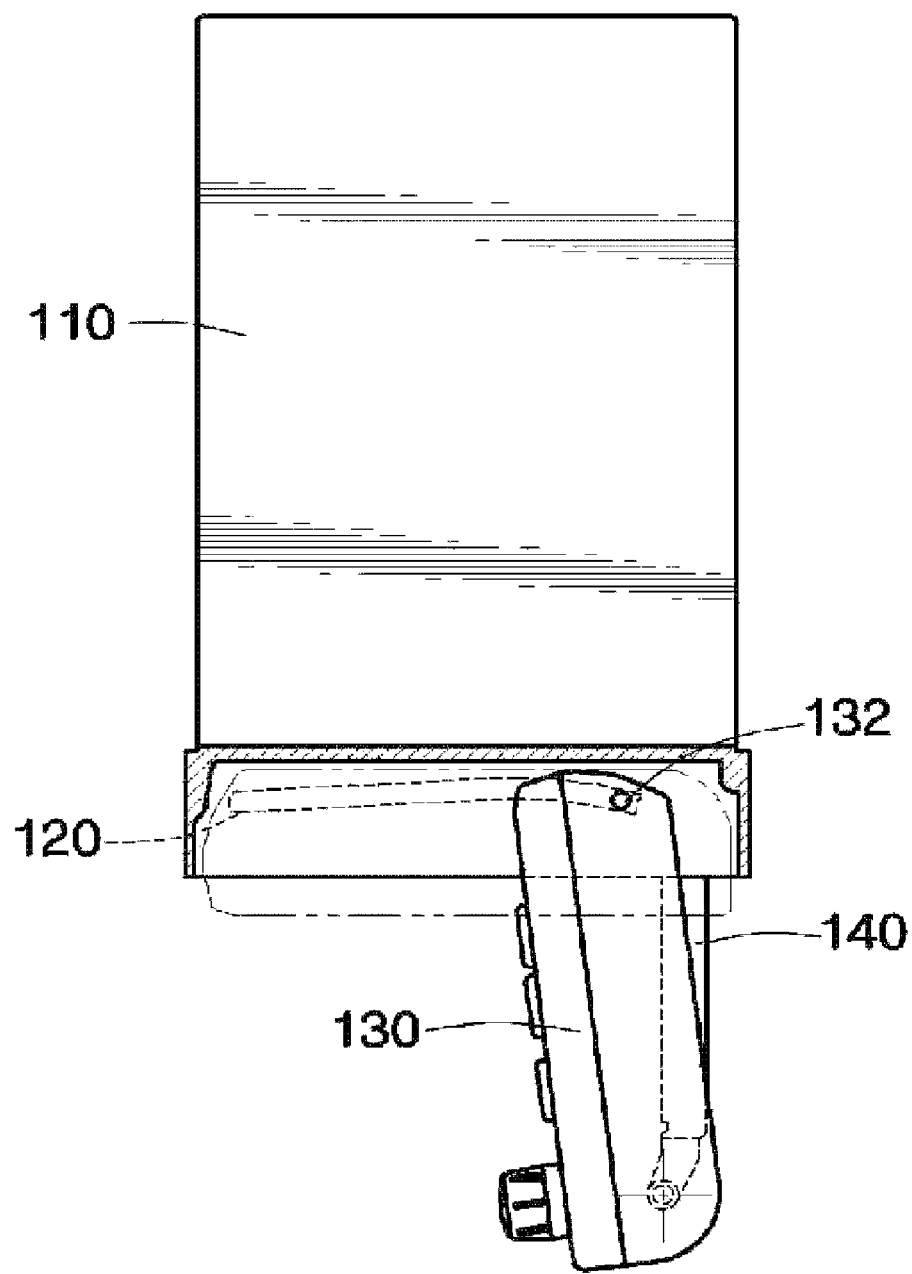
FIG. 1 is a schematic view illustrating a conventional monitor tilting structure of a car audio/video system.

Reference will now be made in detail to the preferred embodiments of the present invention, examples of which are illustrated in the accompanying drawings. Wherever possible, the same reference numerals will be used throughout the drawings to refer to the same or like parts.

Figure 2:
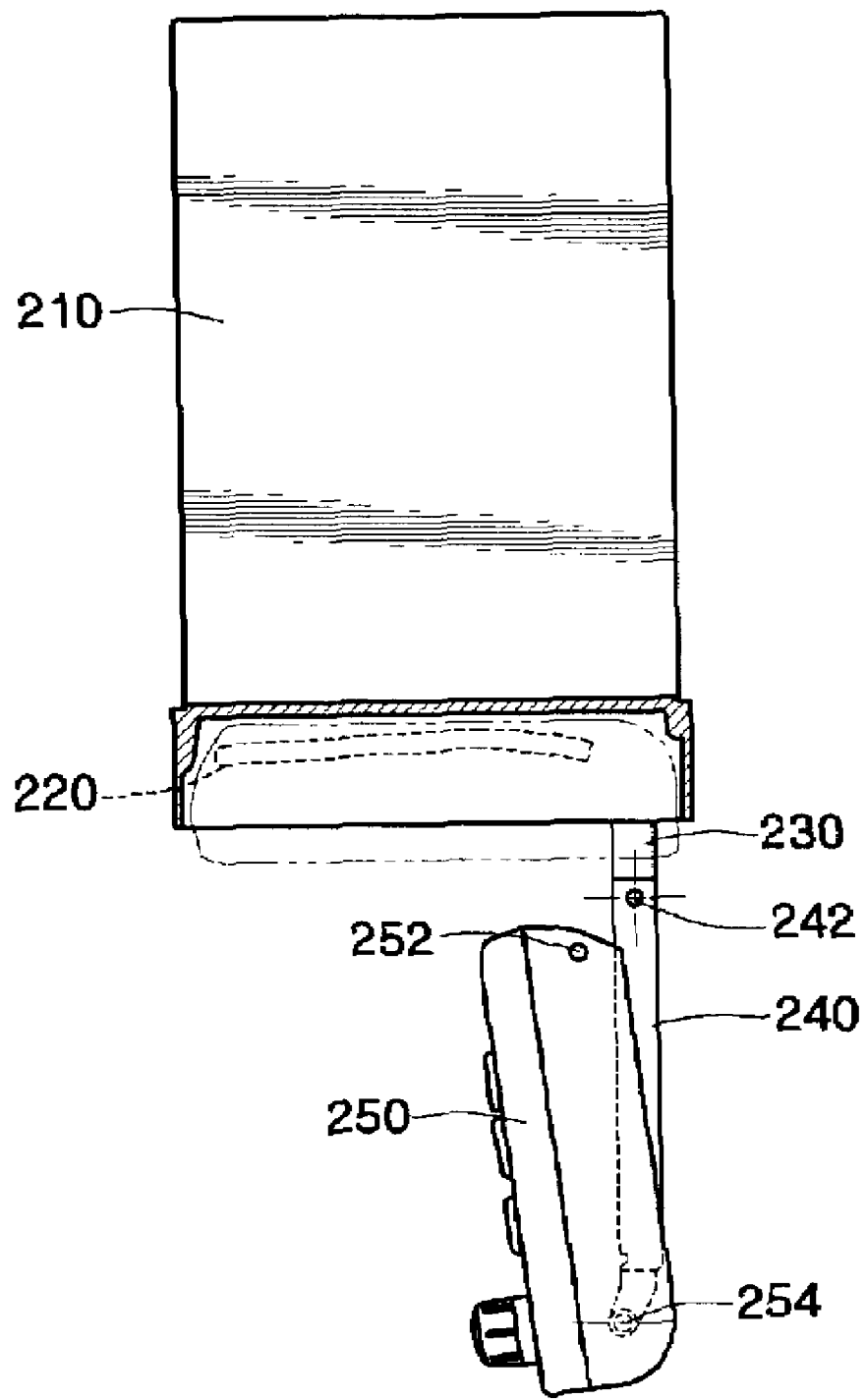
FIGS. 2 to 4 illustrate stepwise constructions of a monitor tilting structure of a car audio/video system according to a preferred embodiment of the present invention.
Figure 3:
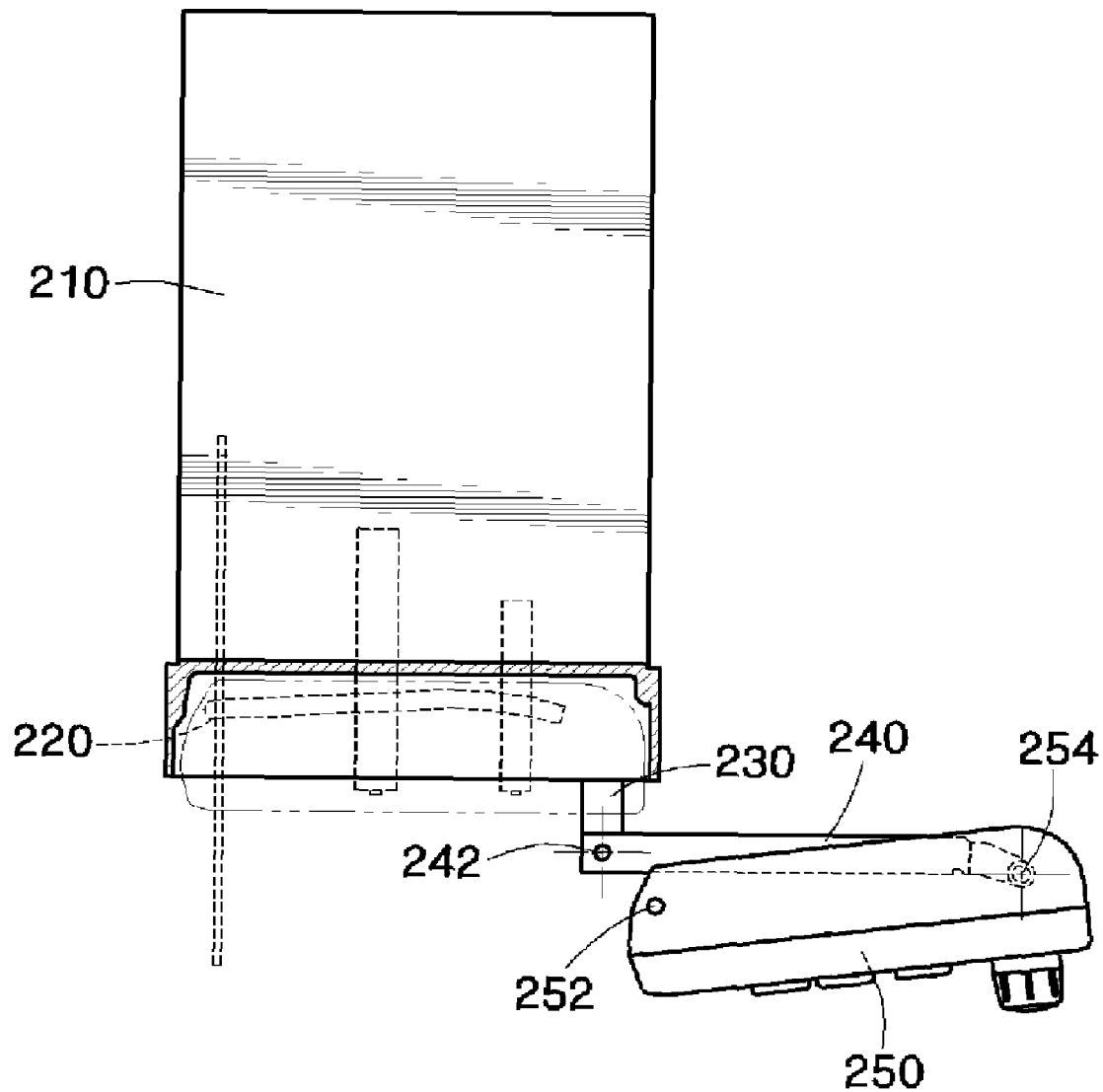
Figure 4:
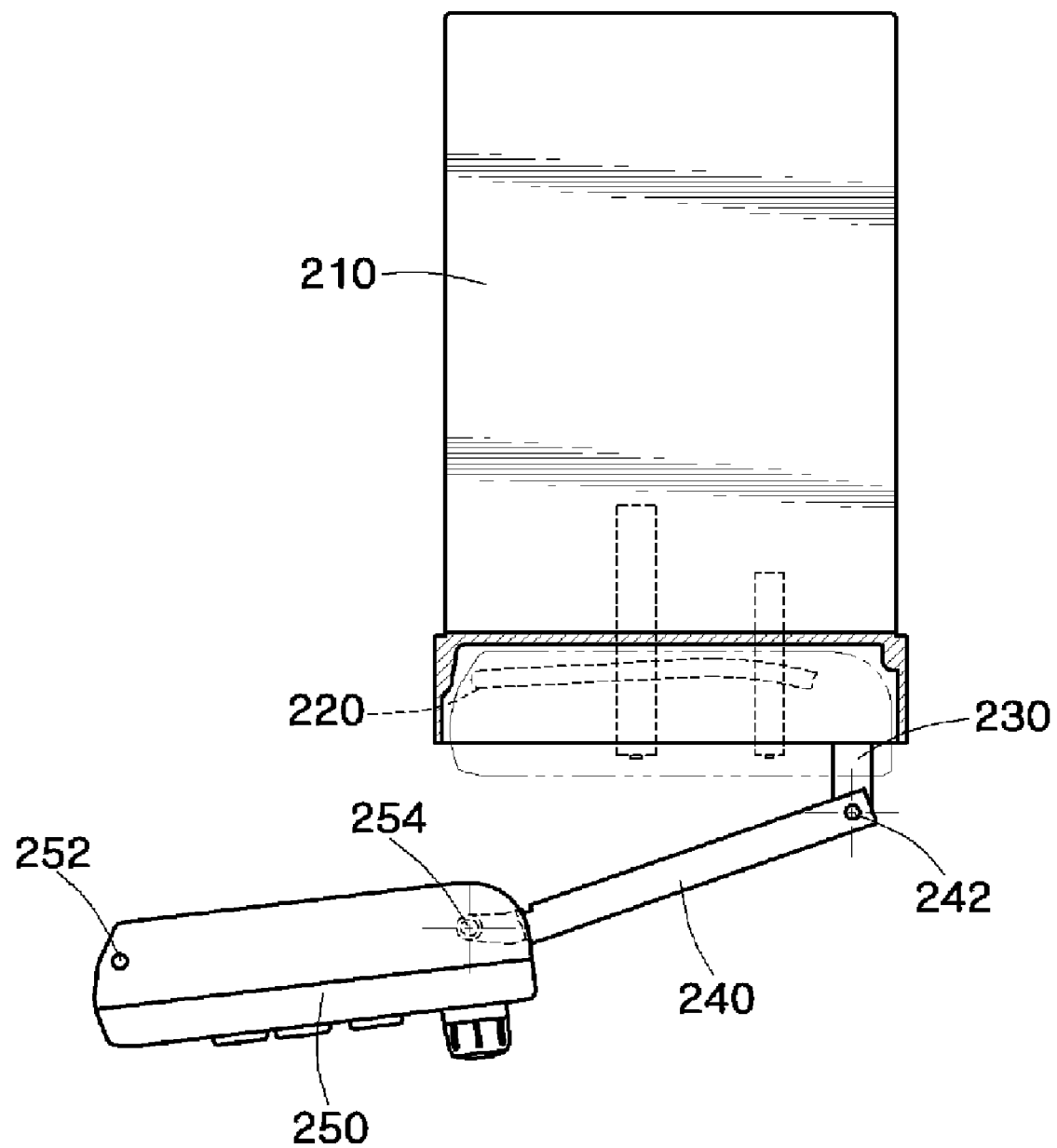

FIGS. 2 to 4 illustrate stepwise constructions of a monitor tilting structure of a car audio/video system according to a preferred embodiment of the present invention.

As shown in FIGS. 2 to 4, the inventive monitor tilting structure of the car audio/video system includes a system housing 210, a guide rail 220, a first guide rod 230, a second guide rod 240, and a monitor main body 250.

The system housing 210 is a main body of the car audio/video system, having a built-in car audio/video driving circuit and installed at a suitable position of a vehicle.

The guide rail 220 is a long hole part for guiding the monitor main body 250 when the monitor main body 250 is inserted into the system housing 210. The guide rail 220 is provided at one side or both sides of an inner side surface of the system housing 210.

The first guide rod 230 is a member for supporting to allow the monitor main body 250 to protrude outside of the system housing 210. The first guide rod 230 is installed at one lower side of the system housing 210.

The second guide rod 240 is a member having one end connected with the first guide rod 230, and the other end connected with the monitor main body 250. The second guide rod 240 is connected at its lower end by a hinge 242 with the first guide rod 230. Accordingly, the second guide rod 240 can be bent in mutual opposite directions centering on the hinge 242.

The monitor main body 250 is a part for outputting an image through a screen. The monitor main body 250 includes a pin 252 moving on the guide rail 220. A hinge shaft 254 is provided on a rear surface of the monitor main body 250, and is connected with an upper end of the second guide rod 240.

In the meantime, an operation of the monitor tilting structure of the car audio/video system according to the preferred embodiment of the present invention will be described as follows.

In a mode where a user enjoys a video displayed on a screen of the monitor main body 250, as shown in FIG. 2, the first and second guide rods 230 and 240 are maintained to be in a straight-line state. On the contrary, in a mode where the user secures the front sight, as shown in FIG. 3 or 4, the second guide rod 240 is bent to the front or rear at a vertical angle or at an almost vertical angle centering on the hinge 242.

As described above, the inventive monitor tilting structure of the car audio/video system has an effect in that it can be not only bent to be in a state of viewing the monitor but also can be bent to the front/rear so that the monitor does not obstruct the front sight, thereby selecting an angle of the monitor depending on a user convenience.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A monitor tilting structure of a car audio/video system, the structure comprising:
    a system housing having a car audio/video driving circuit built in;
    a guide rail provided at an inner side surface of the system housing;
    a first guide rod provided at one lower side of the system housing, wherein the first guide rod protrudes in a first direction out of the system housing;
    a second guide rod hinged on a hinge at its lower end with the first guide rod, wherein the hinge is configured to bend on a first plane defined by the first guide rod, the second guide rod, and a movable direction of the hinge, and wherein the second guide rod is configured to move from about 90 degrees with respect to the first guide rod to about 270 degrees with respect to the first guide rod; and
    a monitor main body comprising a pin configured to move along the guide rail, and comprising a hinge shaft provided at its rear surface, the hinge shaft being connected with an upper end of the second guide rod, wherein the hinge shaft is configured for the monitor main body to rotate by 360 degrees around the hinge shaft on the first plane.

2. The monitor tilting structure of claim 1, wherein the pin is configured to be free from the guide rail.

3. The monitor tilting structure of claim 2, wherein the system housing, the guide rail, the monitor main body, the pin of the monitor main body, and the hinge shaft of the monitor main body are configured for the monitor main body to be inserted into the system housing with the pin inserted into the guide rail.

4. The monitor tilting structure of claim 1, wherein the second guide rod rotates to a position to form a straight line with the first guide rod.

5. The monitor tilting structure of claim 1, wherein the second guide rod rotates to a position to form about right angle with the first guide rod.

\* \* \* \* \*